July 26, 1927.

H. B. BOZARD

TRACTOR HITCH FOR DRILLS

Filed July 15, 1920    2 Sheets-Sheet 1

Inventor:-
Harrison B. Bozard,
By H.P. Doolittle
Atty.

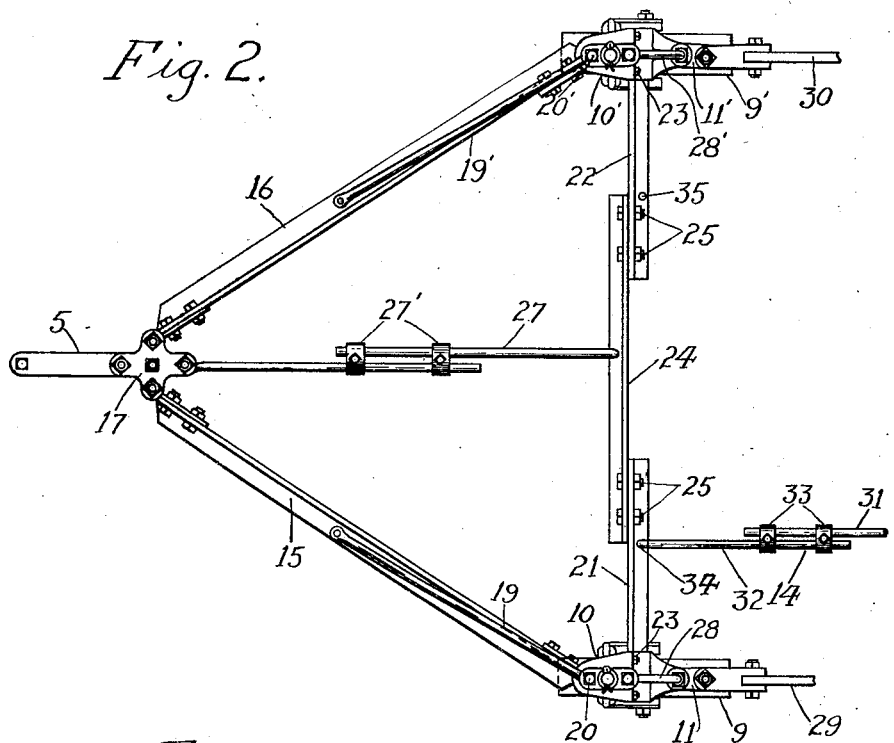
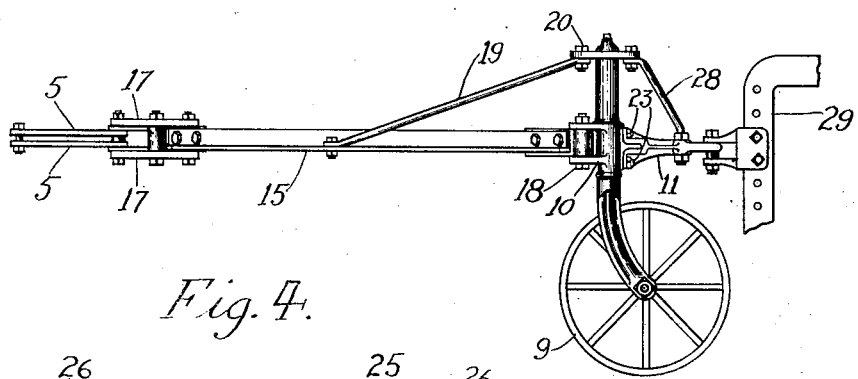
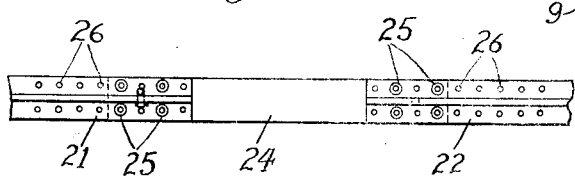

Patented July 26, 1927.

1,636,802

UNITED STATES PATENT OFFICE.

HARRISON B. BOZARD, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

TRACTOR HITCH FOR DRILLS.

Application filed July 15, 1920. Serial No. 396,508.

My invention relates to tractor hitches and has for its object to provide a hitch that is adapted to draw a plurality of drills or other implements in proper trailing relation to the tractor and to each other.

Another object is to provide a tractor hitch that is adjustable transversely of the line of draft so as to adapt a single hitch to draw a plurality of implements of different widths or sizes in proper trailing relation. With the above and other objects in view, reference will now be had to the accompanying drawings for a full description of my invention:

Fig. 2 is an enlarged plan-view of the hitch.

Fig. 3 is a side elevation of the hitch.

Fig. 4 shows a detail of the rear side.

Figure 1:
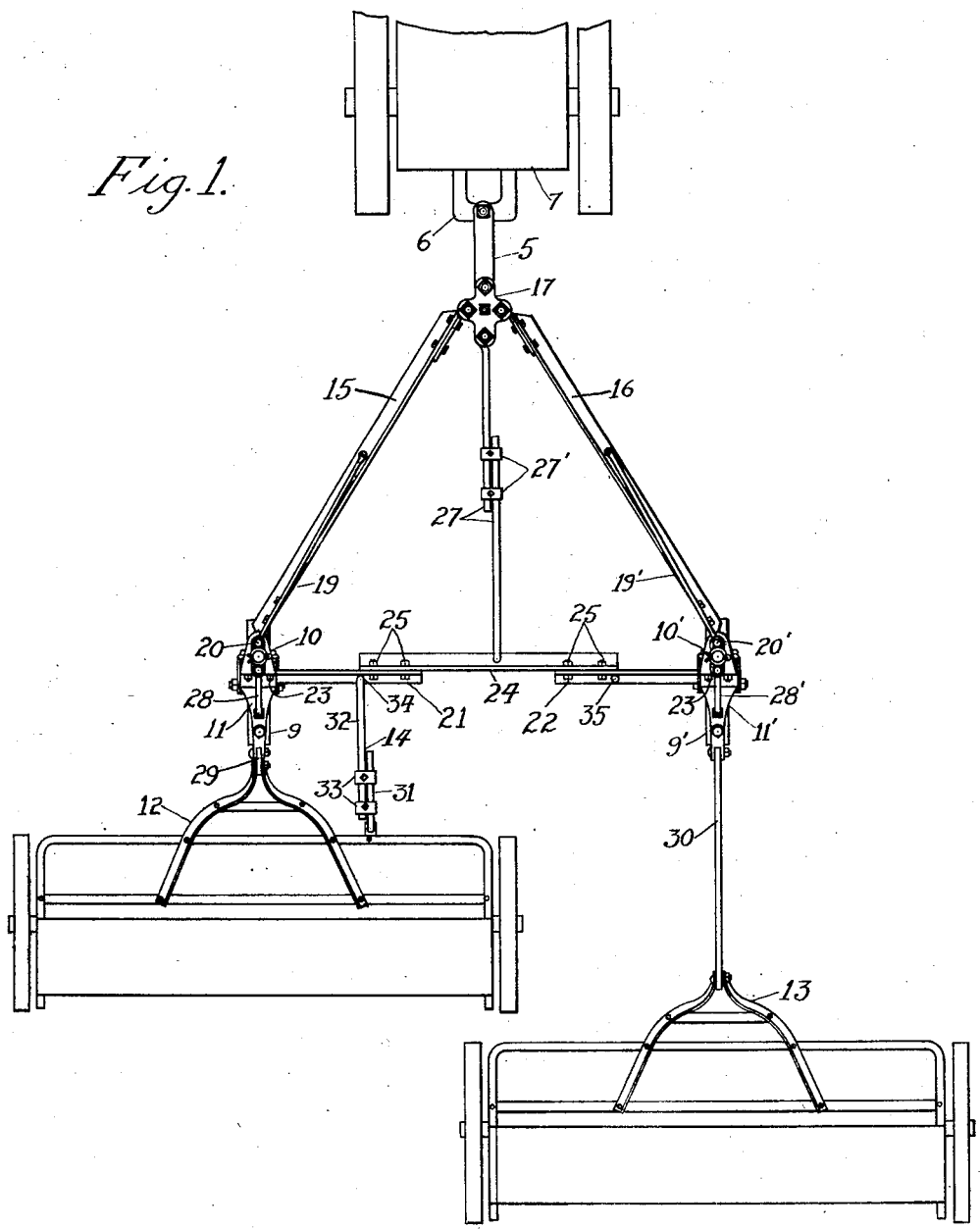
Fig. 1 is a plan view of a tractor drawing two grain drills by means of my improved hitch.

My improved tractor hitch is triangular in form as shown in Figures 1 and 2 and is provided at its forward end or apex with a draft bar 5 which is pivotally connected to the draw-bar 6 of a tractor 7. One side of the triangular frame of the hitch is disposed at the rear and each end of this side is carried by a caster wheel 9, 9' which is pivotally supported in a bracket 10, 10', which carries draw-bar 11, 11' to which drills 12 and 13 are pivotally connected. The leading drill 12 is connected to the rear bar of the hitch by a supplemental draft-bar 14 for a purpose to be described later.

Referring to Figures 2 and 3, the triangular frame of the hitch comprises two side-bars 15, 16, formed from light angle-irons pivotally connected at their front ends to the hinge-plate 17, to which the draft member 5 is also pivotally connected. The rear ends of the side bars are pivotally connected at 18 to the supporting brackets 10, 10' for the caster-wheels. The upper ends of the brackets 10, 10' are supported by the braces 19, 19', which are secured by bolts at one end to the side-bars 15, 16 and pivotally connected at 20, 20' to the brackets 10, 10'; the pivot points 20, 20' being in alignment with the pivotal connections 18 of the side bars. Brace rods 28, 28' are secured at one end to the upper ends of the caster wheel brackets, 10, 10' and secured at the other end to the draw-bars 11, 11'. The rear side of the triangular frame is formed from two sections 21, 22 of a T-bar rigidly secured to the brackets 10, 10' by bolts 23 and a third bar 24 adjustably secured to the sections 21, 22 by bolts 25. The sections 21, 22 and 24 are provided with a plurality of spaced openings 26, adapted to receive the securing means 25 whereby the length of the rear bar may be adjusted as required to draw implements of different widths in proper relation.

A center reinforcing or stiffening bar 27 is pivotally connected at its front to the hinge-plate 17 and at its rear end to the central bar 24 of the rear side of the frame. This stiffening bar prevents distortion and bending of the rear side when the hitch is being used on rough ground and is provided with the adjusting clamps 27' so that its length may be varied to accord with adjustments of the rear bar.

In the drawings I have shown grain drills 12 and 13 connected to the draw-bars 11 by draft tongues 29, 30, the tongue 29 being shorter than the tongue 30, so that the drills are drawn in trailing relation as well as offset.

The leading drill 12 is connected to the rear bar of the hitch by the supplemental draft member 14 in order to keep the drill parallel to the rear bar when passing over rough ground and prevent engagement or interference of the inside wheel with the rear drill. The supplemental draft member 14 is formed in two sections 31, 32, adjustably secured together by the clamps 33 so that its length may be adjusted to suit the particular implement being used. When the implement having the short draft tongue 29 is connected to the left hand side of the hitch, as shown in Figure 1, the supplemental draft member 14 will engage in the opening 34 in the rear draft bar, but if the draft tongues 29 and 30 are reversed so that the shorter tongue is on the right, the supplemental draft member will engage in the opening 35 in the bar 22.

When the first drill or implement is attached to the left side of the hitch as shown in Figure 1, it is necessary that all turns be made to the right and when it is desired to make turns to the left in the field, the draft tongues 29 and 30 must be reversed, thus placing the leading implement on the right.

It will be apparent from the above description and from the drawings that I have provided a hitch that is adapted to draw a plurality of implements of different sizes in proper operative relation, thus if implements wider than the drills shown in the drawings are to be used, the rear side of the hitch will be extended by adjusting the bars 21, 22 and 24, while if smaller or narrower implements are to be used, the rear bar will be shortened to bring the caster-wheels 9 and draw-bars 11 closer together.

Having thus described one embodiment of my invention, what I claim as new and desire to secure by Letters Patent is:

1. In a tractor hitch, the combination of side bars pivotally connected at their front ends and pivotally secured to brackets at their rear ends, caster wheels pivoted in and supporting the brackets, a rear bar connecting the brackets, means for adjusting the length of the rear bar, and a draft bar carried by each of the brackets for connection to an implement.

2. In a tractor hitch, the combination of side bars pivotally connected at their front ends and pivotally secured to brackets at their rear ends, caster wheels pivoted in and supporting the brackets, a rear bar connecting the brackets, means for adjusting the length of the rear bar, reinforcing means connecting the front ends of the side bars with the rear bar intermediate its ends, and a draft bar carried by each of the brackets for connection to an implement.

3. In a tractor hitch, the combination of side bars pivotally connected at their front ends and pivotally secured to brackets at their rear ends, caster wheels pivoted in and supporting the brackets, a rear bar connecting the brackets, means for adjusting the length of the rear bar, reinforcing means connecting the front ends of the side bars with the rear bar intermediate its ends, a draft bar carried by each of the brackets for connection to an implement, and a supplemental draft bar connected to the rear bar and adapted for connection to one of the implements.

4. In a tractor hitch adapted for attachment to the drawbar of a tractor, said hitch comprising a triangular frame embodying two rearwardly extending rigid side-bars pivotally connected at their front ends and a transverse adjustable bar pivotally connected to the rear ends of said side-bars, a longitudinally extending adjustable member connecting the front ends of said side-bars with the transverse adjustable bar, whereby said triangular frame may be adjusted to vary its angles for the purpose of lengthening or shortening said transverse bar, and implement attaching means carried by the ends of said transverse bar.

5. In a tractor hitch adapted for attachment to the drawbar of a tractor, said hitch comprising a triangular frame embodying two rearwardly extending rigid side-bars pivotally connected at their front ends and a transverse adjustable bar pivotally connected to the rear ends of said side-bars, a longitudinally extending adjustable member connecting the front ends of said side-bars with the transverse adjustable bar, whereby said triangular frame may be adjusted to vary its angles for the purpose of lengthening or shortening said transverse bar, trailing implements having draft poles connected to the ends of said transverse bar, and an adjustable supplementary draft member connecting one of said implements with said transverse bar.

In testimony whereof I affix my signature.

HARRISON B. BOZARD.